United States Patent

Okuyama et al.

[11] Patent Number: 5,815,741
[45] Date of Patent: Sep. 29, 1998

[54] IMAGE OBSERVING APPARATUS AND IMAGING APPARATUS UTILIZING THE IMAGE OBSERVING APPARATUS

[75] Inventors: Atsushi Okuyama, Tokorozawa; Shouichi Yamazaki, Yokohama, both of Japan

[73] Assignee: Canon Kabushiki Kaisha, Tokyo, Japan

[21] Appl. No.: 856,684

[22] Filed: May 15, 1997

Related U.S. Application Data

[63] Continuation of Ser. No. 571,193, Dec. 12, 1995, abandoned.

[30] Foreign Application Priority Data

Dec. 21, 1994 [JP] Japan .................................... 6-335933

[51] Int. Cl.⁶ .............................. G03L 7/08; A61B 31/14; G03B 13/02
[52] U.S. Cl. .............................. 396/51; 351/210; 250/221
[58] Field of Search .............................. 396/51; 351/210; 250/221

[56] References Cited

U.S. PATENT DOCUMENTS

| | | | |
|---|---|---|---|
| 4,021,102 | 5/1977 | Iizuka | 351/221 |
| 4,180,309 | 12/1979 | Miyata et al. | 250/201 |
| 4,929,076 | 5/1990 | Masuda et al. | 351/221 |
| 5,093,567 | 3/1992 | Staveley | 250/221 |
| 5,155,516 | 10/1992 | Shindo | 354/219 |
| 5,321,446 | 6/1994 | Massig et al. | 351/214 |
| 5,486,892 | 1/1996 | Suzuki et al. | 354/432 |
| 5,526,082 | 6/1996 | Hirano | 396/51 |
| 5,689,736 | 11/1997 | Okuyama et al. | 396/51 |

FOREIGN PATENT DOCUMENTS

| | | |
|---|---|---|
| 3101709 | 4/1991 | Japan . |
| 3109029 | 5/1991 | Japan . |

*Primary Examiner*—David M. Gray
*Assistant Examiner*—Michael Dalakis
*Attorney, Agent, or Firm*—Fitzpatrick, Cella, Harper & Scinto

[57] ABSTRACT

An image observing apparatus according to the present invention includes: an optical element including a first face inclined relative to an observer, a second face composed of a reflective concave side, and a third face which the light from the image enters so as to have overall a positive refractive power; a line-of-sight detecting device for detecting a line of sight of the observer including a light source to illuminate a fore eye portion of the observer and a light receiving device for receiving an image of the fore eye portion; and a light reflecting device, provided in an observing side of the first face, for reflecting the light emanating from the light source. In this image observing apparatus, the light from the image entering the third face is reflected by the first face, is condenser-reflected at a first face side by the second face, and is irradiated from the first face. Moreover, the light, from the light source, reflected at the fore eye portion of the observer is reflected by the light reflecting device and enters the light receiving device.

25 Claims, 10 Drawing Sheets

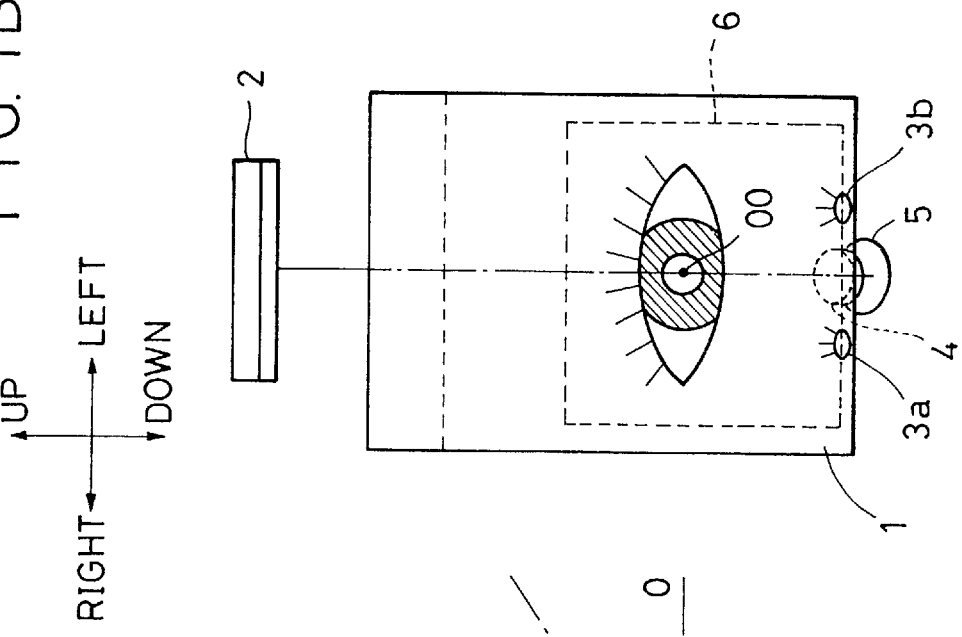
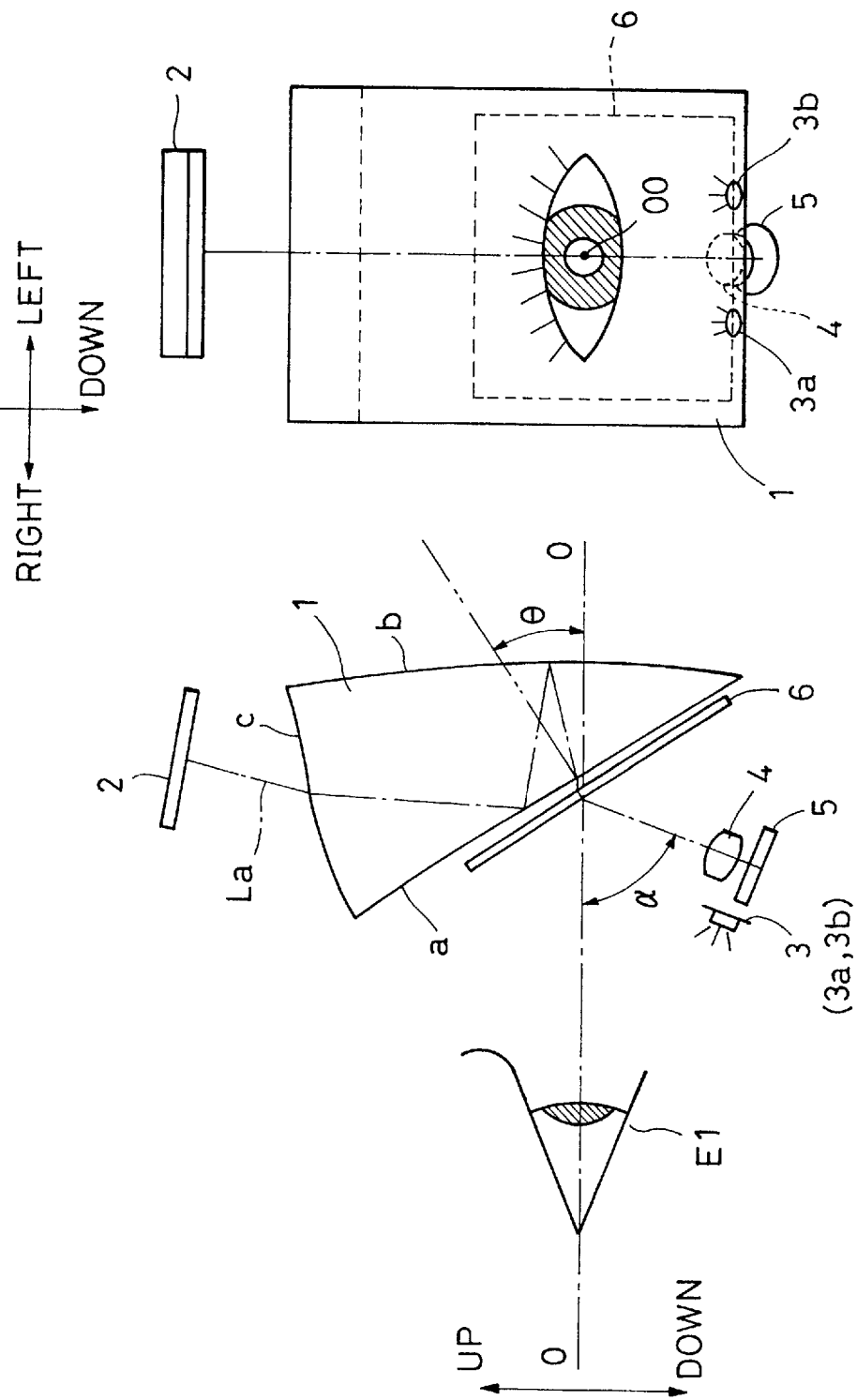
FIG. 1A
FIG. 1B

IMAGE OBSERVING APPARATUS AND IMAGING APPARATUS UTILIZING THE IMAGE OBSERVING APPARATUS

This application is a continuation of application No. 08/571,193, filed Dec. 12, 1995, now abandoned.

BACKGROUND OF THE INVENTION

1. Field of the Invention

The present invention relates to an image observing apparatus and an imaging apparatus utilizing this image observing apparatus, and it is particularly suitable for devices such as a viewfinder of a video camera having a line-of-sight input mechanism and a head mount display with line-of-sight input mechanism mounted in a head portion which detects a line of sight for an observer observing the image displayed in a display means and which adjusts an observing condition for the image by utilizing the data on the line of sight.

2. Description of the Related Art

In the conventional practice, various image observing apparatus are known in which image data displayed in a display means is guided to the eye of an observer so as to be properly observed. Another image observing apparatus is also known in which there is provided an optical system (line-of-sight detecting system) which detects a watching direction; i.e., a so-called a line of sight, by analyzing an image of the observers's eyeball and in which the image data displayed in the display means is controlled by utilizing line-of-sight data obtained by the line-of-sight detection system.

FIG. 10 and FIG. 11 show the image observing apparatus disclosed in Japanese Laid-Open Application 3-101709 (U.S. Pat. No. 5,093,567). FIG. 10 and FIG. 11 are optical path diagrams showing the observance optical system and the line-of-sight detection system, respectively, for the conventional image observing apparatus. Referring to FIG. 10, reference numeral 207 denotes a screen of a CRT. Reference numeral 200 indicates a prism block and is composed of optical elements 210, 211, 212, and 213. Reference numeral 201 is the first concave mirror in which only infrared radiation is reflected and other light is permeated therethrough. Reference numeral 202 is the second concave mirror in which the visible light in a narrow wavelength range from the CRT 207 is reflected thereby and other light is permeated therethrough. Reference numeral 203 is the first plane mirror and serves as a half mirror relative to the infrared radiation and other light is permeated therethrough. Reference numeral 204 indicates relay lenses. Reference numeral 205 is the second plane mirror characterized in that the visible light in a narrow wavelength range from the CRT 207 is reflected thereby and other visible light and infrared radiation are permeated therethrough. Referring to FIG. 11, reference numeral 206 denotes a point infrared radiation source and 208 is a light receiving element of the infrared radiation.

Next, the operation in this conventional example will be described. First, the operation of the image observing optical system will be described with reference to FIG. 10. The light flux from the image formed on the screen 207 of the CRT is reflected at the second plane mirror 205 and is then reflected at the first plane mirror through the relay lenses 204, so that an intermediate image P1 is formed in a focus position of the second concave mirror 202. The light flux from the intermediate image P1 enters a face 218 of the prism block 200 and is total-reflected at a face 216. Thereafter, the light flux is reflected by the second concave mirror 202 and is directed toward an eye E1 of the observer and enters a face 215 through a face 216. Thereafter, the light flux is irradiated from a face 214 so as to enter the eye El. Thereby, there is formed a virtual image expanded before the observer. The observer observes in a manner that the virtual image of this CRT 207 image is overlapped by an outside scene 219 obtained through the face 217 of the prism block 200, the first concave mirror 201, the second concave mirror 202, and faces 216, 215, amd 214.

Next, the operation of the line-of-sight detection system will be described with reference to FIG. 11. The infrared beam emanating from the infrared radiation source 206 passes through the second plane mirror 205 and then the relay lenses 204. Then, the infrared beam is reflected partially at the first plane mirror 203, enters the face 218 of the prism block 200 and is total-reflected at the face 216. Thereafter, the infrared beam is transmitted through the second concave mirror 202 so as to reach the first concave mirror 201. Then, it is directed toward the eye of the observer. After transmitting through the second concave mirror 202 and the face 216, it is incident on the face 215 and irradiated from the face 214 so as to reach and illuminate the eye El of the observer. The image formed on the eye E1 of the observer, irradiated by the infrared radiation, again enters the prism block 200, and passes on the light path backwardly. After being irradiated from the prism block 200, it partially passes through the first plane mirror 203 and enters the light receiving element 208. The line of sight is detected by analyzing an eye's image formed on the light receiving element 208.

However, in the conventional example, the space between the first concave mirror 201 and the light receiving element 208 is rather long. Thus, the required image-forming magnifying power of the eye's image becomes rather large, thereby there is caused a problem in that the size of the light receiving element 208 becomes large and the whole system becomes rather large-sized.

SUMMARY OF THE INVENTION

In view of the foregoing drawbacks, it is therefore an object of the present invention to provide an overall compact-sized image observing apparatus in a manner that an image observing system displaying the image data by a display means in an enlarging manner and a line-of-sight detection system detecting an observer's line of sight are appropriately provided in the image observing apparatus, a so-called head mount display, mounted in a viewfinder of particularly a video camera, etc., or and mounted in an observer's head portion such that the image data displayed in the display means can be observed.

According to the present invention, there is provided an image observing apparatus including an optical system including a first face inclined relative to an observer, a second face comprised of a reflective concave side, and a third face which the light from an image enters so as to have overall a positive refractive power; a line-of-sight detecting device for detecting a line of sight of the observer including a light source to illuminate a fore eye portion of the observer and a light receiving device for receiving an image of the fore eye portion; and a light reflecting device, provided in an observing side of the first face, for reflecting the light emanating from the light source, wherein the light from the image entering the third face is reflected by the first face, is condenser-reflected at a first face side by the second face, and is irradiated from the first face, and wherein the light, from the light source, reflected at the fore eye portion of the observer is reflected by said light reflecting device and enters the light receiving device.

In a preferred embodiment for the image observing apparatus according to the present invention, the first face is inclined relative to a center axis connecting the center of a virtual image of the image formed by the optical system and the center of the eyeball of the observer.

Here, it is preferable that an angle θ formed by a line normal to the first face and the center axis satisfies a condition such that $20° \leq \theta \leq 40°$.

The image observing apparatus according to an embodiment of the present invention further comprises a display means for forming the image.

In another preferred embodiment for the image observing apparatus according to the present invention, the optical system includes a prism member including the first face, second face and third face.

In still another preferred embodiment for the image observing apparatus according to the present invention, the shape of at least one face constituting the optical system is a curved face having a single symmetry plane only.

In still another preferred embodiment for the image observing apparatus according to the present invention, the light source includes an infrared radiation source, and said light reflecting device includes a dichroic film formed on a plate which transmits the visible light and reflects the infrared radiation.

There, it is preferable that the light reflecting means is disposed approximately parallel to the first face.

In still another preferred embodiment for the image observing apparatus according to the present invention, the light source includes an infrared radiation source and the light reflecting device includes a dichroic film formed on the first face which transmits the visible light and reflects the infrared radiation.

In still another preferred embodiment for the image observing apparatus according to the present invention, in the second face there is formed a half mirror which partially transmits the light and partially reflects the light, and in a second face side of the optical system there is provided an optical system which observes the outside scene.

In the image observing apparatus according to an embodiment of the present invention, the display device, optical system, line-of-sight detecting device and light reflecting device are provided for both eyes of the observer.

The image observing apparatus according to the present invention can be suitably used for an imaging device such as a video camera and a head mount display device, etc., so that various controls can be achieved based on the detected data on the line of sight.

Various examples of specific configurations according to the present invention will be made clear in the following description of the preferred embodiments.

BRIEF DESCRIPTION OF THE DRAWINGS

FIG. 1A and FIG. 1B are schematic diagrams showing major parts of the first embodiment according to the present invention.

DESCRIPTION OF THE PREFERRED EMBODIMENT

Figure 2A:
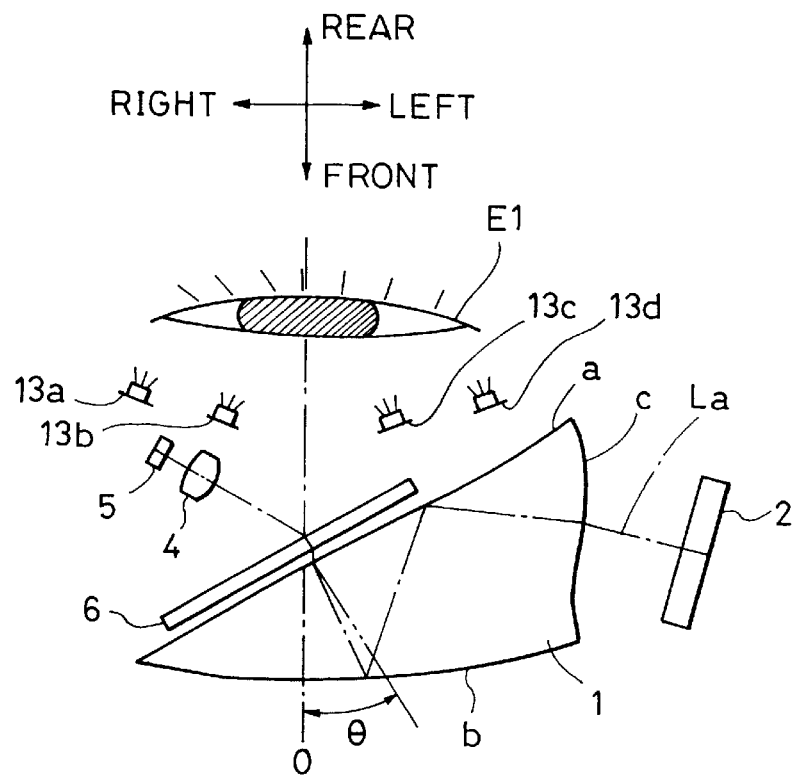
FIG. 2A and FIG. 2B are schematic diagrams showing major parts of the second embodiment according to the present invention.

FIG. 1A and FIG. 1B are schematic diagrams showing major parts of the first embodiment according to the present invention. FIG. 1A is a side view thereof while FIG. 1B is a front view thereof. Referring to FIG. 1A and FIG. 1B, reference numeral 1 denotes an optical element which includes a first active face a, second active face b and third active face c each of which performs the optical action, and which has overall a positive refractive power. Reference numeral 2 indicates a display means which displays an image (projected image) constituted by liquid crystal display elements. Reference number 3 (3a, 3b) is an infrared radiation source which illuminates a fore portion of the eye (eyeball) El of an observer by infrared radiation. Reference numeral 4 is an image-forming lens which image-forms the eye E1 and an reflected image of the cornea of the observer's eye E1 in a reduced manner. Reference numeral 5 is a light receiving element constituted by a photoelectric transfer element, which detects an image formed by the image-forming lens 4. Reference numeral 6 is a plate-type light reflecting means in one face of which there is vapor-deposited a dichroic film which is characterized in reflecting the infrared radiation and transmitting the visible light. The light reflecting means 6 is inclined relative to an observation direction (0—0).

The optical element 1 and display means 2 are provided in the light transmitting side of the light reflecting means 6 if viewed from the point of observation, while the light source 3, image-forming lens 4 and light receiving element 5 are provided in a light reflecting side of the light reflecting means 6 if viewed from the point of observation.

The first active face a of the optical element 1 is inclined in the vertical (up-down) direction of the observer's eye. Namely, the line normal to the first active face a is inclined by θ° relative to a center axis 0—0 (i.e., the axis connecting the center of the observer's eyeball and the center of a virtual image displayed). The second active face b, facing counter to the first active face a, is a strong concave face by which most of the positive refractive power of the optical element 1 is generated. Moreover, in this face there is provided a reflection film which reflects the light.

The display means 2 is provided in an upward position of the eye E1 (or in a downward position if the inclination of the first active face a is opposite to that shown in FIG. 1A). The light reflecting means 6 is arranged in the vicinity of and approximately parallel to the first active face a. The image-forming lens 4 and light receiving element 5 are provided along an axis defined by the path in which the light from the eye E1 on the center axis 0—0 is reflected by the light reflecting means 6, and in a downward position of the eye E1 (or in an upward position if the inclination of the first active face a is opposite to that shown in FIG. 1A). As for the infrared radiation source 3, there are provided at least two infrared radiation sources of a symmetrical configuration relative to a plane parallel to a plane defined by FIG. 1 including the center axis 0—0 in a manner that the infrared radiation source 3 illuminates the eye E1 of the observer from a downwardly inclined position.

Among the above-described elements, the display means 2, optical element 1 and light reflecting means 6 constitute an element of the image observing system, while the infrared radiation source 3, light reflecting means 6, image-forming lens 4 and light receiving element 5 constitute an element of the line-of-sight detecting system.

Now, the optical operation of the image observing system will be described. The light flux from an image displayed in the display means 2 enters the third active face c (plane of incidence), and is total-reflected at the first active face a and is then reflected at the concave reflection face of the second active face b and is then directed to the first active face a. Then, it passes through and is refracted at the first active face a so as to be irradiated from the optical element 1. Thereafter, it passes through the light reflecting means 6 so as to become light flux having a spread angle (convergent angle or parallel) suitable for the observer's diopter and to enter the eye of the observer. Thereby, there is formed a virtual image in the fore direction of the observer.

In order to correct the distortion of the image (virtual image) to be observed, it is effective to enter a ray directed from the center of the image displayed in the display means 2 toward the pupil of the observer in a manner that the ray is inclined relative to the third face c. In order to simultaneously satisfy the image-forming performance and the correction of the distortion, it is desirable that three active faces of the optical element 1 be each constructed by a three-dimensional curved surface. In this embodiment, the three active faces are of the curved surface shape where they are symmetrical to a plane parallel to the plane defined by FIG. 1 including the center axis 0—0. The light reflecting means 6 and the active face a are configured having an air-space therebetween so that the light flux entering from the third active face c is total-reflected in the first active face a of the optical element 1.

The diopter of the observer is adjusted in a manner that the display means 2 is parallel-moved along an optical axis La of the optical element 1.

Next, the optical operation of the line-of-sight detecting system will be described. As shown in FIG. 1B, the two infrared radiation sources 3a, 3b illuminate the fore eye portion of the observer from a direction different from the center axis 0—0. The illuminating light is reflection-diffused at the observer's eye E1 and the cornea of the eye E1. The thus reflected light is reflected by the light reflecting means 6 and is image-formed on the light receiving element 5 by the image-forming lens 4. Then, the light reflected at the cornea forms a Purkinje image, while the light diffused at the pupil forms a pupil image. Based on the Purkinje image and pupil image obtained from the light receiving element 5, the line-of-sight direction of the observer is detected by a line-of-sight detecting circuit (not shown). As a detection method therefor, there may be utilized a method disclosed in the Japanese Patent Laid-Open No. 3-109029 Gazette by the same applicant of this patent application.

In this first embodiment, the first active face a of the optical element 1 is inclined relative to the center axis 0—0, and the light reflecting means 6 is arranged approximately parallel along the first active face a, while the image-forming lens 4 and light receiving element 5 are provided in the light path where the light from the eye E1 is reflected at the light reflecting means 6. By implementing this configuration, the size of the image observing apparatus having the line-of-sight detecting system therein can be reduced, thus being made compact. The image of the fore eye portion can be image-formed on the light receiving element 5 by efficiently utilizing the infrared radiation from the infrared radiation source 3 because the light reflected or diffused at the fore eye portion is directed to the light receiving element 5 by only a single dichroic film. The image-forming magnifying power of the fore eye portion can be made small and the size of the light receiving element 5 can also be made small because the image-forming lens 4 and the light receiving element 5 can be disposed close to each other. At the same time, since a wide range of the fore-eye-portion image can be covered and taken in, the line-of-sight accuracy can be improved.

Moreover, according to the first embodiment, the apparatus is constructed such that the light from the image displayed in the display means 2 enters the third active face c and is total-reflected at the active face a and is reflected at the second active face b and then passes the first active face a again. Thereby, the optical performance, especially the image distortion, is desirably corrected while the light path remains short.

In the first embodiment, an angle θ of inclination of the first active face a is set to approximately 32°. It is desirable that the angle θ of inclination lies in the range where $$20° \leq \theta \leq 40°.$$

If the angle θ is less than 20°, an angle α shown in FIG. 1A becomes smaller and the line-of-sight detecting system is likely to pop out toward an eye side, therefore, the light reflecting means 6 and optical element 1 must be placed away from the eye and thereby the size of the apparatus will increase. On the other hand, if the angle θ is greater than 40°, color shifting generated in the event that the light flux passes through the first active face a becomes larger, thus the image quality thereof will deteriorate.

Figure 2B:
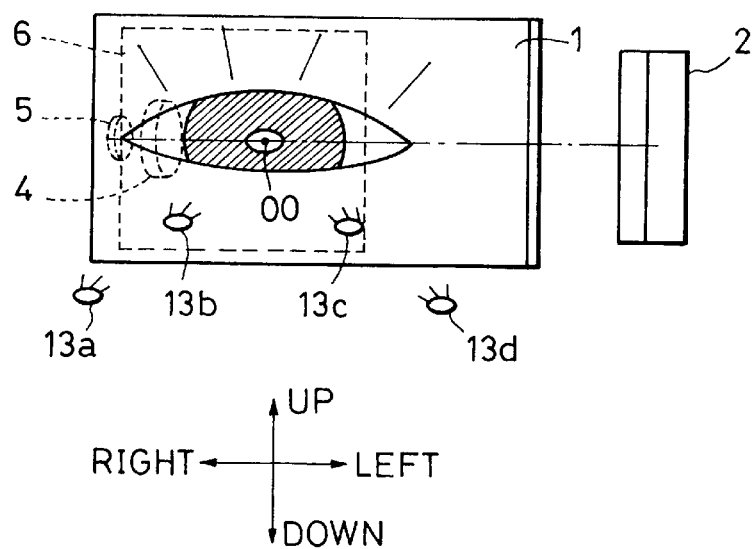

FIG. 2A and FIG. 2B are schematic diagrams showing major parts of the second embodiment according to the present invention. FIG. 2A is a plan view thereof while FIG. 2B is a front view thereof. Compared to the first embodiment shown in FIG. 1A and FIG. 1B, the second embodiment differs therefrom in that four infrared radiation sources are used, and the optical element 1, display means 2 and light reflecting means 6 are rotated around the center axis 0—0. The rest of the configuration in the second embodiment is same as that in the first embodiment.

Therefore, in the second embodiment, the first active face a of the optical element 1 is inclined in the horizontal (left-right) direction of the observer's eye. Namely, a line normal to the first active face a of the optical element 1 is inclined by θ° relative to the center axis 0—0.

The display means 2 is arranged in the left side of the eye E1 (or in the right side of the eye E1 if the inclination of the first active face a is opposite to that shown in FIG. 2A). The image-forming lens 4 and light receiving element 5 are arranged in the right side of the eye E1 along an axis in which the light from the eye E1 on the center axis 0—0 is reflected by the light reflecting means 6 (or in the left side of the eye E1 if the inclination of the first active face a is opposite to that shown in FIG. 2A). There are arranged four infrared radiation sources 13 of a symmetrical configuration relative to a plane parallel to a plane defined by FIG. 2 including the center axis 0—0 in a manner that the infrared radiation sources 13a–13d illuminate the eye E1 of the observer from a downwardly inclined position.

The infrared radiation sources 13b, 13c play the same role as described in the first embodiment. The infrared radiation sources 13a, 13d provided outside the infrared radiation sources 13b, 13c are provided for the purpose that when the observer wears glasses or the like, the virtual image of the infrared radiation source formed in the surface of the glasses shall not be image-formed on the light receiving element 5 so that the angle of the incidence of the illuminating light is made greater. It shall be appreciated that this configuration just described can be applied to that of the first embodiment.

Among the above-described elements, the display means 2, optical element 1 and light reflecting means 6 constitute an element of the image observing system, while the infrared radiation sources 13a–13d, light reflecting means 6, image forming lens 4 and light receiving element 5 constitute an element of the line-of-sight detecting system.

The optical operation of the image observing system is basically same as in the first embodiment.

Next, the optical operation of the line-of-sight detecting system will be described. The infrared radiation emanating from the infrared radiation source 13 (13a, 13b, 13c, 13d) illuminates the fore eye portion of the observer in a direction different from the center axis 0—0 as shown in FIG. 2B. The illuminating light is reflection-diffused at the observer's eye E1 and the cornea of the eye E1. The thus reflected light is reflected by the light reflecting means 6 and is image-formed on the light receiving element 5 by the image-forming lens 4. Then, the light reflected at the cornea forms a Purkinje image, while the light diffused at the pupil forms a pupil image. Based on the Purkinje image and pupil image obtained from the light receiving element 5, the line-of-sight direction of the observer is detected by a line-of-sight detecting circuit (not shown).

In the second embodiment, an angle θ of inclination of the first active face a is set to approximately 32°.

Similarly advantageous effects to the first embodiment will be obtained in this second embodiment.

Figure 3:
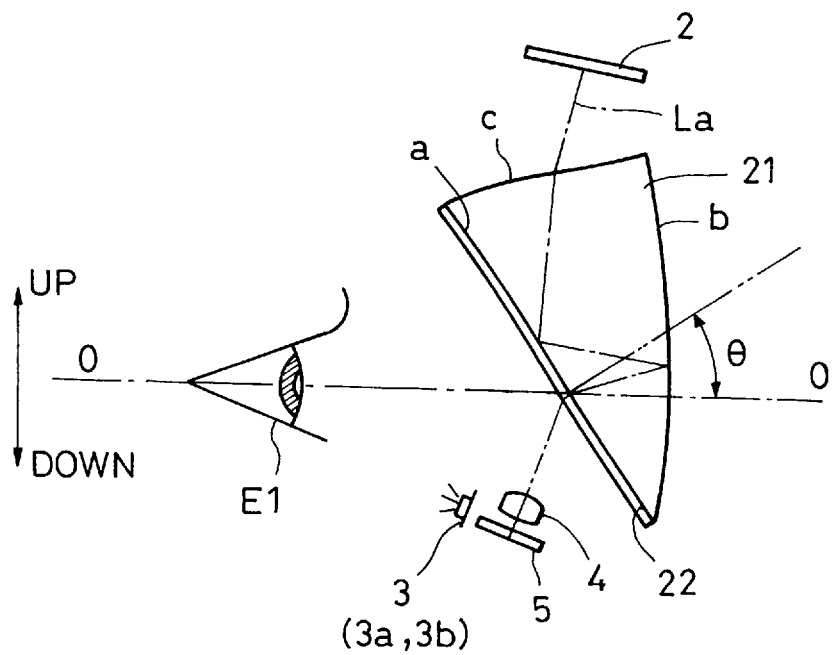
FIG. 3 is a schematic diagram showing major parts of the third embodiment according to the present invention.

FIG. 3 is a schematic diagram showing major parts of the third embodiment according to the present invention. Reference numeral 21 denotes an optical element which differs from the optical element 1 of the first embodiment in that it transmits the visible light on the first active face a, there is formed a dichroic film 22 which reflects the infrared radiation, and the dichroic film 22 functions as a film reflecting means, and its remaining construction is same as in the first embodiment.

Among the respective elements, the display means 2 and optical element 21 constitute an element of the image observing system, while the infrared radiation sources 3a, 3b, dichroic film 22, image forming lens 4 and light receiving element 5 constitute an element of the line-of-sight detecting system.

The optical operation of the image observing system is basically the same as in the first embodiment.

Now, the optical operation of the line-of-sight detecting system will be described. The infrared radiation irradiated from the infrared radiation sources 3a, 3b illuminates the fore eye portion of the observer in a direction different from the center axis 0—0. The illuminating light is reflection-diffused at the observer's eye E1 and the cornea of the eye E1. The thus reflected light is reflected by the dichroic film 22 on the first active face a and is image-formed on the receiving element 5. Then, the light reflected at the cornea forms a Purkinje image, while the light diffused at the pupil forms a pupil image. Based on the Purkinje image and pupil image obtained from the light receiving element 5, the line-of-sight direction of the observer is detected by a line-of-sight detecting circuit (not shown).

The advantageous effects achieved by the third embodiment are approximately the same as in the first embodiment. However, the third embodiment is further effective in that the plate-type light reflecting means 6 (shown in FIG. 1A and FIG. 1B) is eliminated and thus the overall construction is made simpler and is more cost-efficient.

Figure 4:
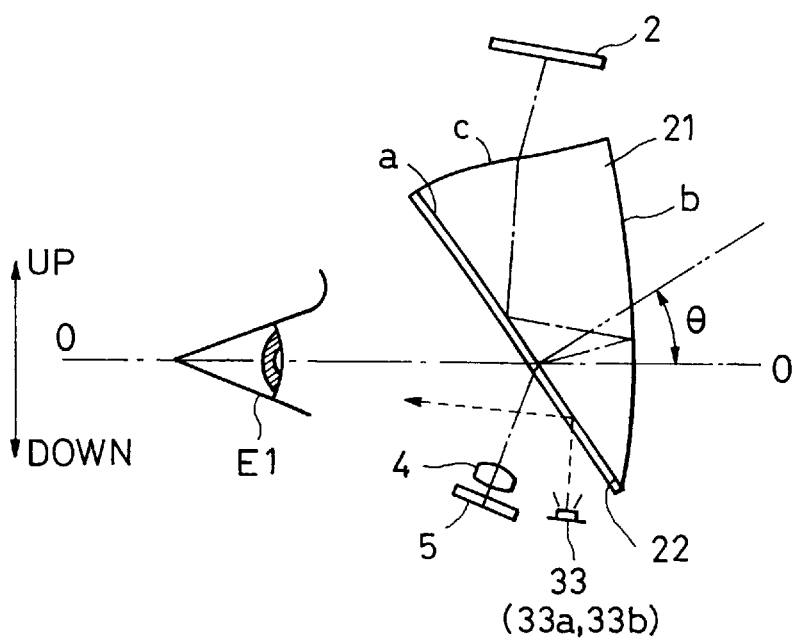
FIG. 4 is a schematic diagram showing major parts of the fourth embodiment according to the present invention.

FIG. 4 is a schematic diagram showing major parts of the fourth embodiment according to the present invention. The fourth embodiment modifies the third embodiment in a manner that the infrared radiation sources 33a, 33b are arranged toward the first active face a so that after the illuminating light is reflected at the dichroic film 22 on the first active face a it illuminates the fore eye portion of the observer. Thereby, the erroneous line-of-sight detection due to the eyelid and shadows of the eyelashes can be prevented because the fore eye portion is illuminated from near the front face against the eye E1, thus achieving highly accurate line-of-sight detection. It shall be appreciated that this configuration just described can be applied to those of other embodiments.

Figure 5:
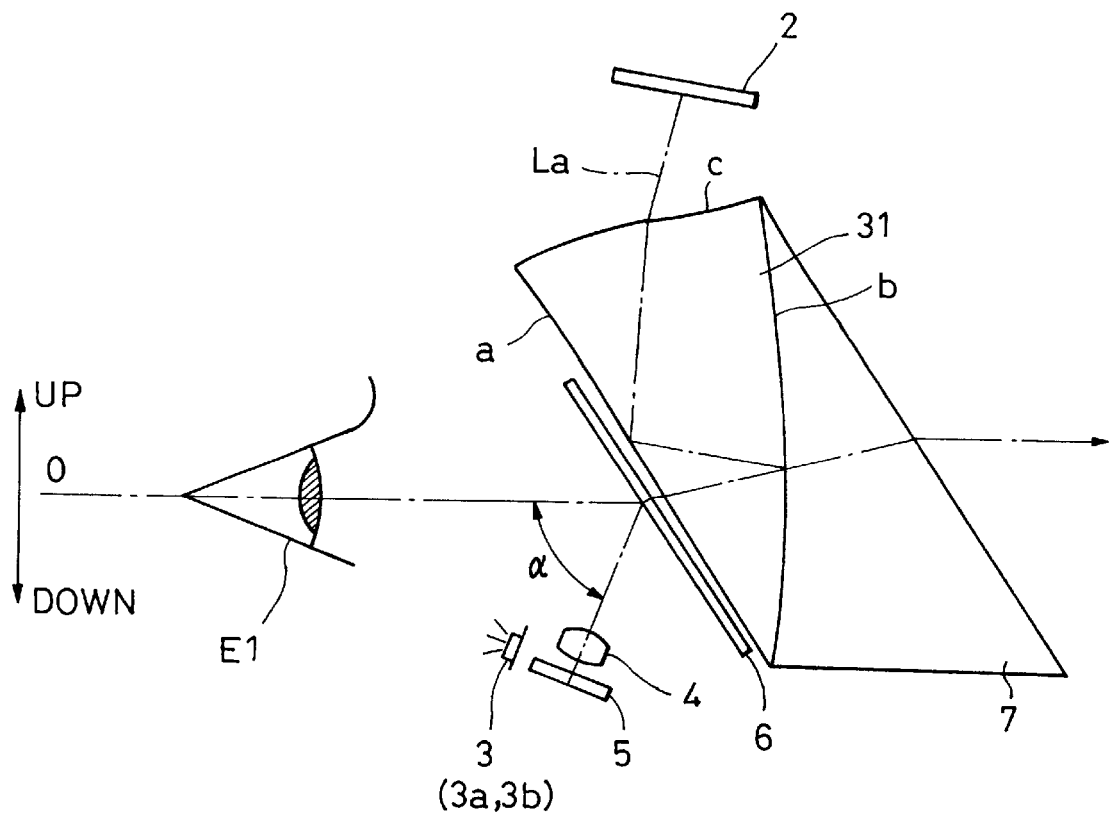
FIG. 5 is a schematic diagram showing major parts of the fifth embodiment according to the present invention.

FIG. 5 is a schematic diagram showing major parts of the fifth embodiment according to the present invention. The fifth embodiment indicates an image observing apparatus of a see-through type where the image displayed in the display means 2 and an outside scene can be simultaneously observed.

Referring to FIG. 5, reference numeral 31 denotes an optical element which differs from the optical element 1 of the first embodiment in that the second active face b is changed to a half mirror having a predetermined reflection factor. Now, changing the second face b to a half mirror alone can not realize forming a life-size see-through optical system because of prism interaction, each aberration and refractive power due to the eccentricity of the optical element 31. Therefore, a see-through auxiliary member 7 is connected to the second active face b, or is provided with a slight air-space therebetween so that the prism interaction, aberration and refractive power can be eliminated.

In the image observing apparatus of the fifth embodiment, similar advantageous effects to the first embodiment can be obtained, furthermore the outside scene can be simultaneously observed.

Figure 6:
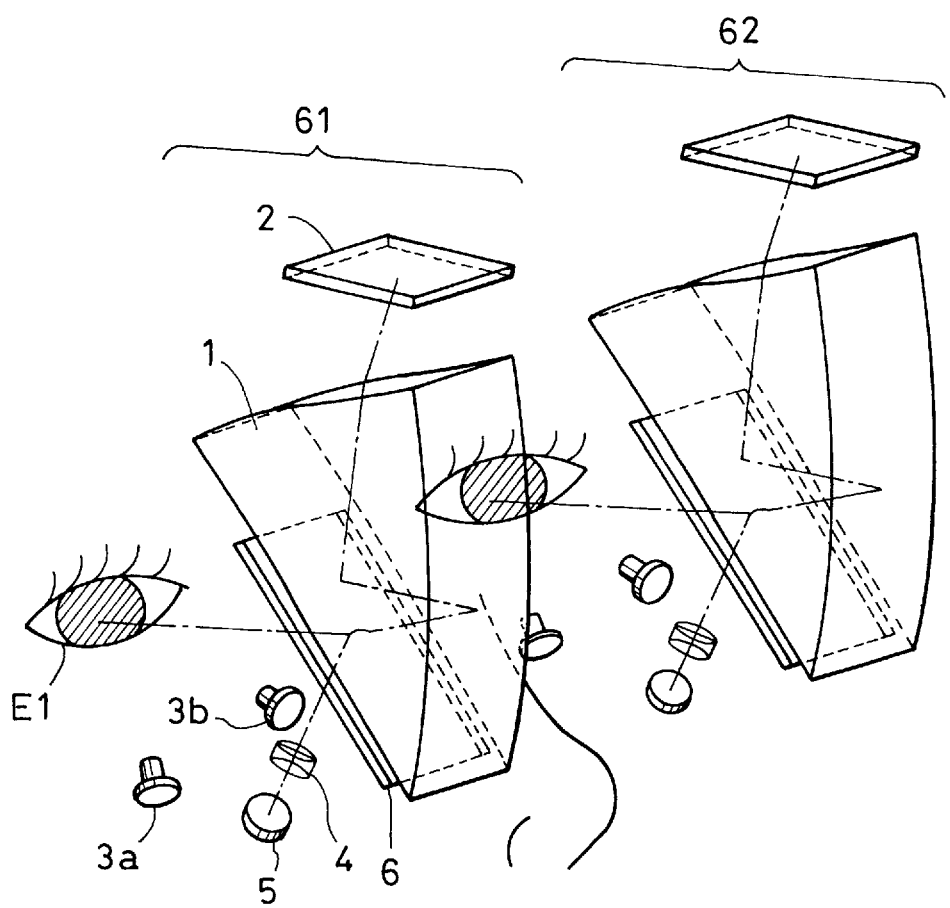
FIG. 6 is a schematic diagram showing major parts of the sixth embodiment according to the present invention.

FIG. 6 is a schematic diagram showing major parts of the sixth embodiment according to the present invention. The sixth embodiment indicates a binocular image observing apparatus. Referring to FIG. 6, reference numerals 61, 62 are each image observing apparatus of the first embodiment. In the sixth embodiment, the image observing apparatus having the same structure are provided for both eyes of the observer so as to construct the binocular image observing apparatus.

In the sixth embodiment, the display means 2, 2 are provided in an upward position of the eye. By thus configuring the binocular image observing apparatus, the image having the parallax is displayed in both the right eye and left eye, so that a stereoscopic image can be easily enjoyed. Moreover, the line-of-sight detection systems at both eyes detect the line-of-sight directions for each eye, so that a three-dimensional watching point can be detected.

Figure 7:
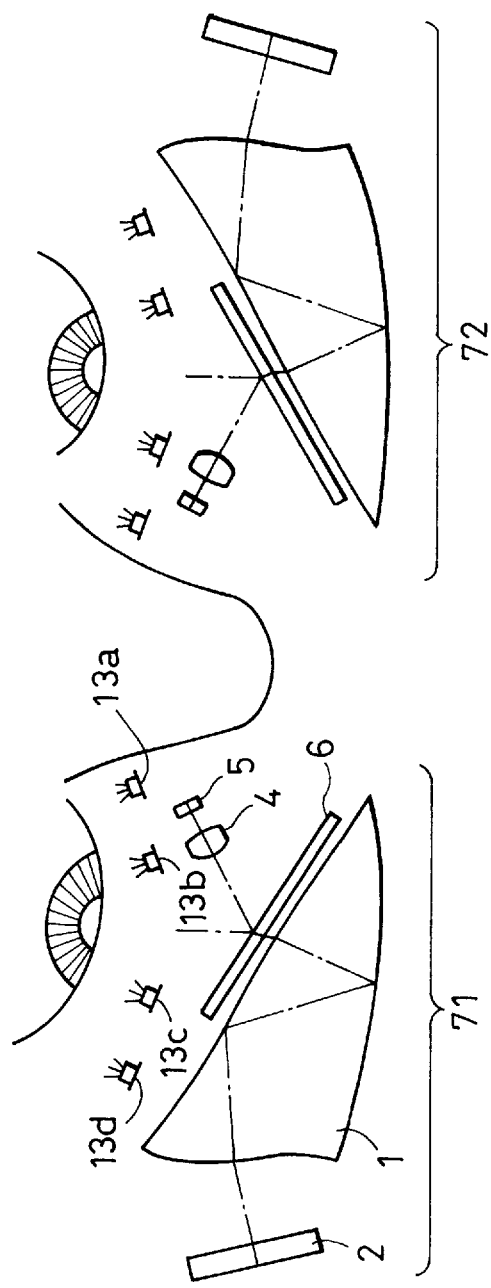
FIG. 7 is a schematic diagram showing major parts of the seventh embodiment according to the present invention.

FIG. 7 is a schematic diagram showing major parts of the seventh embodiment according to the present invention. The seventh embodiment indicates another binocular image observing apparatus and FIG. 7 is a plan view thereof. Referring to FIG. 7, reference numerals 71, 72 are each the image observing apparatus of the second embodiment. In the seventh embodiment, the image observing apparatus having the same structure are provided for both eyes of the observer so as to construct the binocular image observing apparatus.

In the seventh embodiment, the display means 2 for use with the right eye is arranged at the right side of the observer's right eye, while another display means 2 for use with the left eye is arranged at the left side of the observer's left eye, thus the whole apparatus can be constructed with a compact size. By thus configuring the binocular image observing apparatus, the image having the parallax is displayed in both the right eye and left eye, so that a stereoscopic image can be easily enjoyed. Moreover, the line-of-sight detection systems at both eyes detect the line-of-sight directions for each eye, so that a three-dimensional watching point can be detected.

Figure 8:
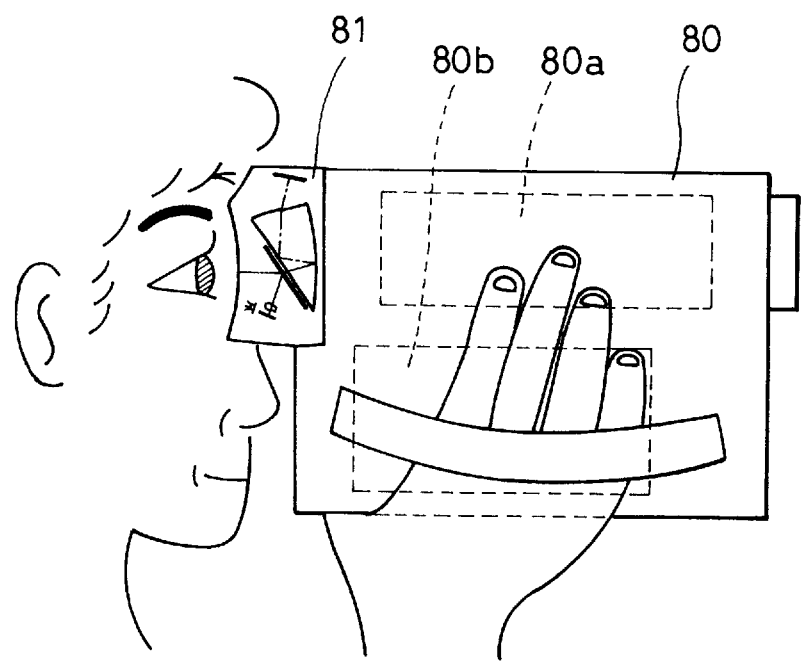
FIG. 8 is a schematic diagram showing major parts of the eighth embodiment according to the present invention.

FIG. 8 is a schematic diagram showing major parts of the eighth embodiment according to the present invention. The eighth embodiment is modified over the first embodiment in a manner that the image observing apparatus of the first embodiment is mounted to a video camera equipment. FIG. 8 illustrates video camera photographing held by an observer in that a camera body 80 comprised of an imaging portion 80a (imaging means) and a recording portion 80b (recording means) are integrally constructed into the image observing apparatus 81 (observing means) of the first embodiment so as to construct the video camera equipment. The image observing apparatus according to the eighth embodiment can be utilized as a usual integral-type video camera, and the imaging portion as well as the recording portion can be variously controlled based on the observer's line-of-sight data obtained from the observing means 81.

Figure 9:
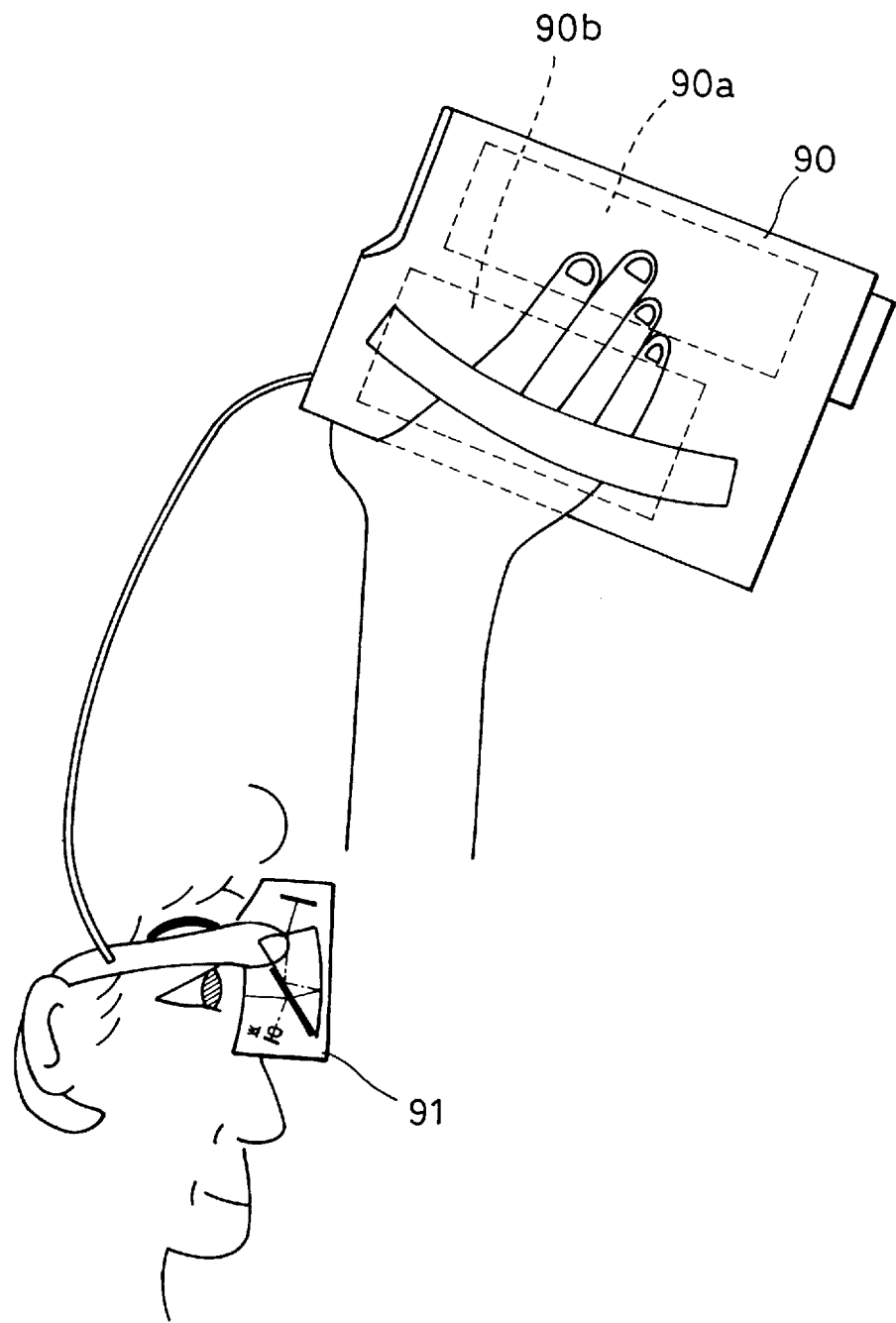
FIG. 9 is a schematic diagram showing major parts of the ninth embodiment according to the present invention.

FIG. 9 is a schematic diagram showing major parts of the ninth embodiment according to the present invention. The ninth embodiment indicates an example where the image observing apparatus of the first embodiment is applied to a video camera. In the ninth embodiment, the image observing apparatus according to the first embodiment is provided such that an image observing apparatus 91 (observing means) is detachable from a camera body 90 comprised of an imaging portion 90a (imaging means) and a recording portion 90b (recording means). The video camera is constructed such that the image observing apparatus 91 is mounted to a head portion of the observer by a supporting member when detached and is connected to the camera body 90 through a flexible signal wire.

In the video camera according to the ninth embodiment, video camera photographing can be easily performed from a position where a photographing person extends an arm upwardly and from a position close to the ground level and so on, so as to achieve flexible imaging styles. At the same time, the imaging portion as well as the recording portion can be variously controlled based on the observer's line-of-sight data obtained from the observing means 91.

It shall be appreciated that the video camera is configured such that the image observing means is integrally constructed with the imaging means while the recording means only is connected to the thus integrated observing and imaging means through the flexible signal wire.

By implementing the above-described structure, an overall image observing apparatus can be made compact-sized in a manner that an image observing system displaying the image data by a display means in an enlarging manner and a line-of-sight detection system detecting an observer's line of sight are appropriately provided in the image observing apparatus, a so-called a head mount display, mounted in viewfinder of particularly a video camera, etc., or mounted in an observer's head portion such that the image data displayed in the display means can be observed.

Besides those already mentioned above, many modifications and variations of the above embodiments may be made without departing from the novel and advantageous features of the present invention. Accordingly, all such modifications and variations are intended to be included within the scope of the appended claims.

What is claimed:

1. An image observing apparatus comprising:
   an optical element including a first face inclined relative to an observer, a second face comprised of a reflective concave side, and a third face which light from an image enters so as to have overall a positive refractive power;
   line-of-sight detecting means for detecting a line of sight of the observer including a light source provided on an observing side of said optical element to illuminate a fore eye portion of the observer and a light receiving means for receiving an image of the fore eye portion; and
   light reflecting means, provided in an observing side of the first face, between the first face and the light source, for reflecting the light emanating from the light source,
   wherein the light from the image entering the third face is reflected by the first face, is convergently-reflected to a first face side by the second face, and emerges from the first face, and
   wherein the light, from the light source, reflected at the fore eye portion of the observer is reflected by said light reflecting means and enters said light receiving means.

2. An image observing apparatus according to claim 1, wherein said first face is inclined relative to a center axis connecting the center of a virtual image of the image formed by said optical element and a center of a eyeball of the observer.

3. An image observing apparatus according to claim 2, wherein an angle θ formed by a line normal to said first face and the center axis satisfies a condition such that $$20° \leq \theta \leq 40°.$$

4. An image observing apparatus according to claim 1, further comprising a display means for forming the image.

5. An image observing apparatus according to claim 1, wherein said optical element includes a prism member including a first face, second face and third face.

6. An image observing apparatus according to claim 1, wherein a shape of at least one face constituting said optical element is a curved face having a single symmetry plane only.

7. An image observing apparatus according to claim 1, wherein said light source includes an infrared radiation source, and said light reflecting means includes a dichroic film formed on a plate which transmits visible light and reflects infrared radiation.

8. An image observing apparatus according to claim 7, wherein said light reflecting means is disposed approximately parallel to said first face.

9. An image observing apparatus according to claim 1, wherein said light source includes an infrared radiation source and said light reflecting means includes a dichroic film formed on said first face which transmits the visible light and reflects infrared radiation.

10. An image observing apparatus according to claim 1, wherein in said second face there is formed a half mirror which partially transmits the light and partially reflects the light, and in a second face side of said optical element there is provided an auxiliary member for observing an outside scene.

11. An image observing apparatus according to claim 4, wherein said display means, optical element, line-of-sight detecting means and light reflecting means are provided for both eyes of the observer.

12. An imaging apparatus comprising:
an imaging means for taking an image;
a recording means for recording the image taken by said imaging means; and
observing means including:
an optical element including a first face inclined relative to an observer, a second face comprised of a reflective concave side, and a third face which light from one of the taken image and the recorded image enters so as to have overall a positive refractive power;
line-of-sight detecting means for detecting a line of sight of the observer including a light source provided on an observing side of said optical element to illuminate a fore eye portion of the observer and a light receiving means for receiving an image of the fore eye portion; and
light reflecting means, provided in an observing side of said first face, for reflecting the light emanating from said light source,
wherein the light, from the image entering said third face is reflected by said first face, is convergently-reflected to a first face side by said second face, and emerges from said first face, and
wherein the light from said light source, reflected at the fore eye portion of the observer is reflected by said light reflecting means and enters said light receiving means.

13. An imaging apparatus according to claim 12, wherein said first face is inclined relative to a center axis connecting a center of a virtual image of the image formed by said optical element and a center of eyeball of the observer.

14. An imaging apparatus according to claim 13, wherein an angle θ formed by a line normal to said first face and the center axis satisfies a condition such that $$20° \leq \theta \leq 40°.$$

15. An imaging apparatus according to claim 12, further comprising a display means for forming the image.

16. An imaging apparatus according to claim 12, wherein said optical element includes a prism member including said first face, second face and third face.

17. An imaging apparatus according to claim 12, wherein the shape of at least one face constituting said optical element is a curved face having a single symmetry plane only.

18. An imaging apparatus according to claim 12, wherein said light source includes an infrared radiation source, and said light reflecting means includes a dichroic film formed on a plate which transmits visible light and reflects infrared radiation.

19. An imaging apparatus according to claim 18, wherein said light reflecting means is disposed approximately parallel to said first face.

20. An imaging apparatus according to claim 12, wherein said light source includes an infrared radiation source and said light reflecting means includes a dichroic film formed on said first face which transmits the visible light and reflects the infrared radiation.

21. An imaging apparatus according to claim 12, wherein in said second face there is formed a half mirror which partially transmits the light and partially reflects the light, and in a second face side of said optical element there is provided an auxiliary member for observing an outside scene.

22. An imaging apparatus according to claim 15, wherein said display means, optical element, line-of-sight detecting means and light reflecting means are provided for both eyes of the observer.

23. An imaging apparatus according to claim 12, wherein at least one of said imaging means and said recording means is controlled by utilizing data regarding the line of sight detected by said line-of-sight detecting means.

24. An imaging apparatus according to claim 12, wherein at least one of said imaging means, recording means and observing means is detachable.

25. An imaging apparatus for taking an image and for recording the image comprising:
an observing means including:
an optical element including a first face, a second face, and a third face so as to have overall a positive refractive power;
line-of-sight detection means for detecting a line of sight of the observer including a light source provided on an observing side of said optical element to illuminate a fore eye portion of the observer and a light receiving means for receiving an image of the fore eye portion; and
light reflecting means, provided in an observing side of said first face, for reflecting the light emanating from said light source,
wherein the light, from the image entering said third face is reflected by said first face, is convergently-reflected to a first face side by said second face, and emerges from said first face, and
wherein the light from said light source, reflected at the fore eye portion of the observer is reflected by said light reflecting means and enters said light receiving means.

* * * * *

UNITED STATES PATENT AND TRADEMARK OFFICE
CERTIFICATE OF CORRECTION

PATENT NO. : 5,815,741          Page 1 of 2
DATED : September 29, 1998
INVENTOR(S) : Okuyama et al.

Figure 10:
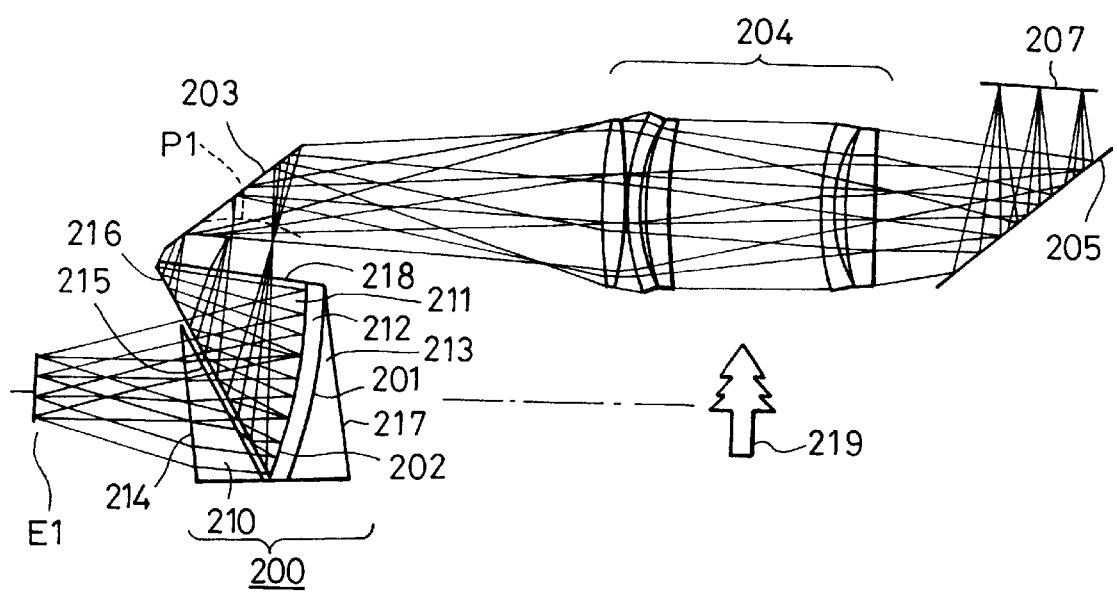
FIG. 10 illustrates the conventional example.

It is certified that error appears in the above-identified patent and that said Letters Patent is hereby corrected as shown below:

SHEET 9 OF THE DRAWINGS:

FIG. 10 should be labelled --CONVENTIONAL ART--.

Figure 11:
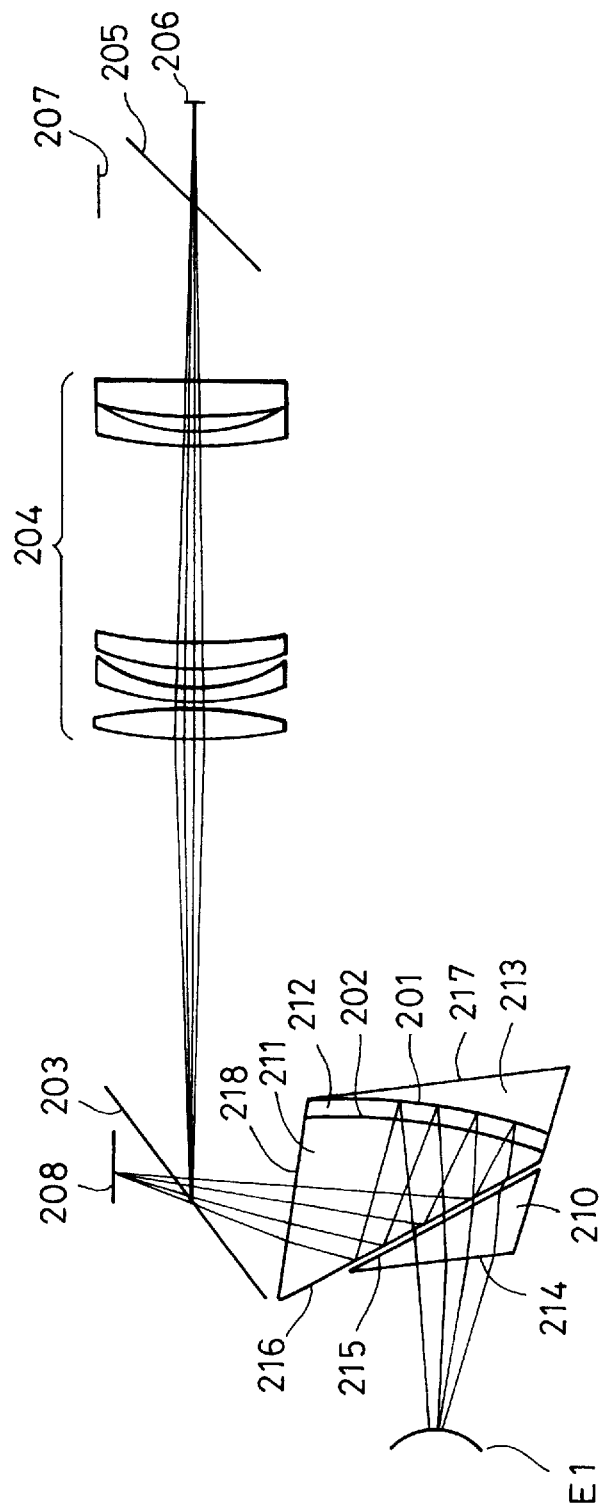
FIG. 11 illustrates the conventional example.

SHEET 10 OF THE DRAWINGS:

FIG. 11 should be labelled --CONVENTIONAL ART--.

On the title page,
Item [56] REFERENCES CITED:

FOREIGN PATENT DOCUMENTS

"3101709" should read --3-101709--; and "3109029" should read --3-109029--.

COLUMN 1:

Line 27, "a" (second occurrence) should read --an--; and
    Line 28, "observers's" should read --observer's--.

COLUMN 2:

Line 10, "amd" should read --and--; and
    Line 50, "and" should be deleted.

UNITED STATES PATENT AND TRADEMARK OFFICE
CERTIFICATE OF CORRECTION

PATENT NO. : 5,815,741  
DATED : September 29, 1998  
INVENTOR(S) : Okuyama et al.

Page 2 of 2

It is certified that error appears in the above-identified patent and that said Letters Patent is hereby corrected as shown below:

COLUMN 4:

Line 29, "elements. Reference number" should read --elements, etc. Reference numeral--;  
Line 33, "an" should read --a--; and  
Line 36, "element," should read --element, etc.,--.

COLUMN 10:

Line 2, "a" (second occurrence) should be deleted, and "in" should read --in a--;  
Line 37, "the" (first occurrence) should read --a--; and  
Line 38, "a" (second occurrence) should read --an--.

Signed and Sealed this

First Day of June, 1999

Attest:

Q. TODD DICKINSON

*Attesting Officer*　　*Acting Commissioner of Patents and Trademarks*